| United States Patent [19] | [11] Patent Number: 4,719,126 |
| Henery | [45] Date of Patent: Jan. 12, 1988 |

[54] PYROLYTIC DEPOSITION OF METAL OXIDE FILM FROM AQUEOUS SUSPENSION

[75] Inventor: Vern A. Henery, Pittsburgh, Pa.

[73] Assignee: PPG Industries, Inc., Pittsburgh, Pa.

[21] Appl. No.: 463,195

[22] Filed: Feb. 2, 1983

[51] Int. Cl.$^4$ .............................................. B05D 5/06
[52] U.S. Cl. .................................... 427/165; 65/60.52; 427/168; 427/226; 427/314; 427/421; 427/427
[58] Field of Search ............... 427/314, 421, 387, 427, 427/226, 165, 168, 190, 180; 68/60.52

[56] References Cited

U.S. PATENT DOCUMENTS

| 2,688,565 | 9/1954 | Raymond | 117/35 |
| 3,107,177 | 10/1963 | Saunders et al. | 427/314 |
| 3,660,061 | 5/1972 | Donley et al. | 65/32 |
| 4,289,816 | 9/1981 | Fogelberg et al. | 427/226 |
| 4,308,319 | 12/1981 | Michelotti et al. | 428/432 |
| 4,397,671 | 8/1983 | Vong | 427/190 |

*Primary Examiner*—Janyce A. Bell
*Attorney, Agent, or Firm*—Donna L. Seidel

[57] ABSTRACT

A method is disclosed for depositing metal-containing films using relatively water-insoluble coating reactants by dispersing said coating reactants in powder form into an aqueous medium with vigorous agitation to form an aqueous physical suspension.

10 Claims, 1 Drawing Figure

PYROLYTIC DEPOSITION OF METAL OXIDE FILM FROM AQUEOUS SUSPENSION

BACKGROUND OF THE INVENTION

The present invention relates generally to the art of pyrolytic deposition of metal-containing films, and more particularly to the pyrolytic deposition of metal oxide films from aqueous compositions of coating reactants.

The pyrolytic deposition of metal oxide films onto a glass surface is described in U.S. Pat. No. 3,660,061 to Donley et al. Organometallic salts, preferably acetylacetonates, are dissolved in an organic vehicle such as methylene chloride. Other suitable solvents include aliphatic and olefinic halocarbons, halogenated hydrocarbons, alcohols, and nonpolar aromatic compounds such as benzene and toluene. The organic solution is sprayed onto a hot glass surface where it thermally decomposes to form a metal oxide film which alters the reflectance and transmittance of solar energy by the glass.

Current interest in eliminating the health and environmental hazards of using large volumes of organic solvents has encouraged the development of aqueous coating compositions. It is known from U.S. Pat. No. 2,688,565 to Raymond that light reflecting coatings of cobalt oxide may be deposited by contacting a hot glass surface with an aqueous solution of cobalt acetate. However, such films have a grainy, irregular texture and are highly porous, resulting in poor acid resistance evidenced by debonding of the film.

U.S. Pat. No. 4,308,319 to Michelotti et al discloses the pyrolytic deposition of a durable, uniform, solar energy reflecting spinel-type film from an aqueous solution of a water soluble cobalt salt and a water soluble tin compound. In a development related to the present invention, U.S. patent application Ser. No. 463,194 filed on even date herewith by C. B. Greenberg discloses a method for depositing metal-containing films from aqueous compositions wherein ultrafine powder coating reactants are chemically suspended in an aqueous medium comprising a chemical wetting agent to form an aqueous chemical suspension which does not require constant vigorous agitation.

SUMMARY OF THE INVENTION

The present invention involves the pyrolytic deposition of light and heat reflective metal oxide films having similar spectral, physical and chemical properties in comparison with films pyrolytically deposited from organic solutions. However, films in accordance with the present invention are pyrolytically deposited from an aqueous suspension wherein organometallic coating reactants typically used in organic solutions are physically suspended in an aqueous medium by means of vigorous and continuous mixing. The organometallic coating reactants physically suspended in an aqueous medium may be pyrolytically deposited to form metal oxide films on a hot glass substrate using conventional spray equipment and under temperature and atmosphere conditions generally encountered in pyrolytic coating operations. As a result, commercially acceptable metal oxide films comparable to those currently deposited from organic solutions can now be produced using the same coating facilities while eliminating the costs and hazards of organic solvents by employing aqueous suspensions.

DESCRIPTION OF THE DRAWING

The FIGURE illustrates a mix tank 1 equipped with a stirrer 2 which agitates the aqueous medium to maintain organometallic coating reactants in suspension. The aqueous suspension is conveyed by conduit 3 through a gear pump 4 which ensures uniform flow of the suspended reactant en route to spray guns (not shown). A recirculation loop 5 equipped with a valve 6 and pressure gauge 7 carries aqueous suspension not delivered to the spray guns back to the mix tank 1 for continuous mixing.

DESCRIPTION OF THE PREFERRED EMBODIMENTS

Figure 1:
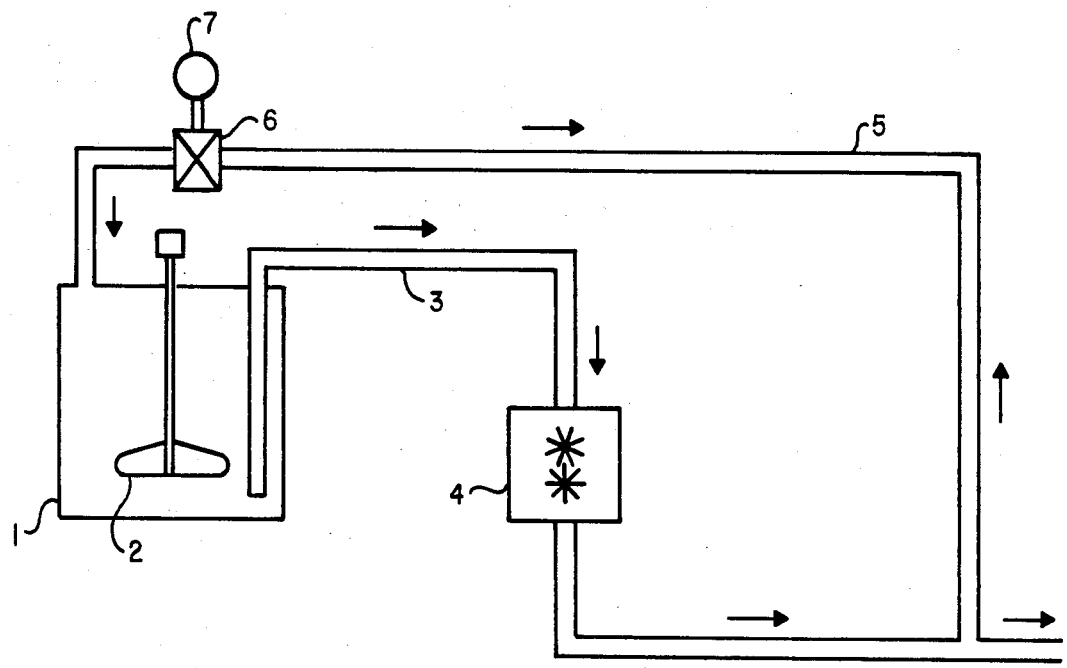

While interest in eliminating the health and environmental hazards, as well as the cost, of organic solvents in pyrolytic coating processes has encouraged the use of aqueous coating solutions, many coating reactants, particularly organometallic coating reactants, have such low solubility limits in water that commercial pyrolytic deposition has not been feasible. For example the acetylacetonates disclosed in U.S. Pat. No. 3,660,061 for pyrolytic deposition of metal oxide films on glass produce high quality, high performance coated products. However, their solubilities in water are relatively low; at 30° C. only 0.3% for cobaltic acetylacetonate and only 0.15% for chromic acetylacetonate. At such concentrations, very large volumes of aqueous solutions would be required, resulting in prohibitive cooling of the glass as well as unacceptably slow film formation rates.

In accordance with the present invention, relatively water-insoluble coating reactants, such as acetylacetonates, are physically suspended in an aqueous medium by continuous mixing. Thereby, concentrations as high or higher than those obtainable in organic solvents may be achieved in an aqueous suspension. The resulting aqueous suspension may be applied by conventional means, typically spraying, to a substrate to be coated, particularly a hot glass surface, preferably a float glass ribbon.

Although acetylacetonates are the preferred coating reactants in accordance with the present invention, various other organometallic coating reactants may also be employed, as well as relatively water-insoluble compounds in general. The principle of physically suspending a relatively insoluble coating reactant in an aqueous medium has wide applicability in the field of pyrolytic deposition of metal-containing films.

In preferred embodiments of the present invention, relatively water-insoluble coating reactants are obtained in solid, powder form. The powder is milled to a uniform, flour-like consistency. Preferably, the particle size of the powder is small enough to pass through a 325 mesh screen. In typical coating processes, when a mixture of metal oxides is desired in the film, organometallic coating reactants are first mixed together in the desired proportions, and then physically suspended in the aqueous medium.

The aqueous medium is typically just water. However, the vigorous mixing required to maintain the coating reactants in suspension may generate foaming. For this reason an anti-foaming agent may be useful. Conventional, commercially available defoamers, particularly silicone based products such as those available from Dow Corning, are suitable. If a defoamer is used, it is added to the water prior to addition of the coating reactant. A surfactant may also be beneficial in reducing foaming. Depending on the particular spray equipment to be used, a thickening agent such as polyethylene glycol may be added to the aqueous suspension to increase the viscosity of the suspension and improve the texture of the resultant coating. However, the essential feature of the present invention involves the use of coating reactants physically suspended in an aqueous medium, and not the various additives which are optional.

In a most preferred embodiment of the present invention, a mixture of metal acetylacetonates is blended, milled, sifted through a 325 mesh screen and added with vigorous agitation to water which contains a small amount of a silicone anti-foaming agent. An aqueous suspension is physically formed and maintained by continuous mixing. (If mixing is discontinued, the coating reactants will settle out overnight.) The aqueous suspension is continuously circulated by means of a gear pump, which also provides continuous milling of the suspension to maintain uniformity, and is delivered by means of conventional pyrolytic spray equipment to the surface of a hot float glass ribbon. The coating reactants pyrolyze to form a metal oxide film having similar spectral, physical and chemical properties to a film formed by pyrolysis of the same coating reactants in an organic solution.

The present invention will be further understood from the description of specific examples which follow.

EXAMPLE I

An aqueous suspension is prepared by blending 400 grams of cobaltic acetylacetonate, 116 grams of ferric acetylacetonate and 136 grams of chromic acetylacetonate, and adding the mixture with vigorous agitation to 4 liters of water. The aqueous suspension thus formed is continuously mixed and recirculated as illustrated in FIG. 1 using a Teel gear pump, and is ultimately delivered by means of spray guns to the surface of a glass sheet which is at a temperature of about 1100° F. The organometallic coating reactants pyrolyze to form a mixed metal oxide film comparable to the films formed from organic solutions of the same reactants as taught in U.S. Pat. No. 3,660,061, the disclosure of which is incorporated herein by reference.

EXAMPLE II

An aqueous suspension is prepared by blending 180 grams of chromic acetylacetonate, 133 grams of cobaltic acetylacetonate and 133 grams of ferric acetylacetonate, and adding the mixture with vigorous agitation to 3 liters of water. The aqueous suspension thus formed is continuously mixed and recirculated, and finally delivered to a hot glass surface as in Example I. A light and heat reflective metal oxide film is formed.

EXAMPLE III

An aqueous suspension is prepared by blending 336 grams of iron acetylacetonate with 114 grams of nickel acetylacetonate and adding the mixture with vigorous agitation to 3 liters of water. The aqueous suspension thus formed is continuously mixed and recirculated as in the previous examples, and applied to a hot glass substrate to pyrolytically deposit a uniform film.

EXAMPLE IV

An aqueous suspension is prepared by blending 100 grams of cobaltic acetylacetonate, 29 grams of ferric acetylacetonate and 34 grams of chromic acetylacetonate, and adding the mixture with vigorous agitation to 250 milliliters of water. To reduce foaming, the water contains 3 grams of AEROSOL ® RT 70%, a silicone-based anti-foaming agent available from American Cyanamid. The aqueous suspension is continuously mixed and recirculated as in the previous examples, and delivered by spray gun to a hot glass surface. A metal oxide film is formed which shows no deleterious effects from the presence of the anti-foaming agent.

The above examples are offered to illustrate the present invention. Various other coating reactants, concentrations, additives, substrates, and temperatures may be used to form a wide variety of coatings. The scope of the present invention is defined by the following claims.

I claim:

1. A method for depositing a metal-containing film on a substrate which comprises the steps of:
   a. dispersing a relatively water-insoluble coating reactant with vigorous mixing into an aqueous medium to physically suspend said reactant in said aqueous medium to form an aqueous suspension; and
   b. contacting a surface of the substrate with said aqueous suspension at a temperature sufficient to cause said coating reactant to react thereby depositing a film on said substrate surface.

2. The method according to claim 1, wherein said coating reactant is an organometallic composition.

3. The method according to claim 2, wherein said organometallic composition comprises metal acetylacetonate.

4. The method according to claim 3, wherein said organometallic composition comprises a mixture of cobalt, iron and chromium acetylacetonates.

5. The method according to claim 1, wherein the aqueous medium is water.

6. The method according to claim 5, wherein the aqueous medium further comprises an anti-foaming agent.

7. The method according to claim 6, wherein the anti-foaming agent is a silicone based composition.

8. The method according to claim 1, wherein the substrate to be coated is glass.

9. The method according to claim 8, wherein said glass substrate is at a temperature sufficient to pyrolyze organometallic coating reactants on contact.

10. The method according to claim 9, wherein said glass substrate is contacted with an aqueous suspension of metal acetylacetonates to form a metal oxide film.

* * * * *